United States Patent [19]

Lee

[11] Patent Number: 5,031,962
[45] Date of Patent: Jul. 16, 1991

[54] LOW PROFILE WEB ADJUSTER

[75] Inventor: David J. Lee, Carmel, Ind.

[73] Assignee: Indiana Mills & Manufacturing, Inc., Westfield, Ind.

[21] Appl. No.: 499,946

[22] Filed: Mar. 27, 1990

[51] Int. Cl.$^5$ ............................................. A47L 31/00
[52] U.S. Cl. .................................... 297/479; 297/468; 297/479
[58] Field of Search ....................... 297/476, 479, 484; 24/170, 191, 188

[56] References Cited

U.S. PATENT DOCUMENTS

| | | | |
|---|---|---|---|
| 3,434,186 | 3/1969 | Rennert | 24/191 |
| 3,872,550 | 3/1975 | Yang | 24/170 |
| 4,679,852 | 7/1987 | Anthony et al. | 297/464 |

Primary Examiner—Kenneth J. Dorner
Assistant Examiner—Milton Nelson, Jr.
Attorney, Agent, or Firm—Woodard, Emhardt, Naughton, Moriarty & McNett

[57] ABSTRACT

A low profile web adjuster for securing a web. An infant seat includes a harness, one end of which extends through a web adjuster mounted to the seat. A pivot cam on the adjuster is operable to lockingly engage one end of the harness. In the preferred embodiment, the cam is moved by pushing a control member having a pair of arms pivotally mounted to the cam member at a location to force the cam member apart from the web. In an alternate embodiment, a fabric strap attached to a pull control in turn has a pair of arms pivotally mounted to the cam at a location to force the cam apart from the web when the strap is pulled.

4 Claims, 6 Drawing Sheets

LOW PROFILE WEB ADJUSTER

BACKGROUND OF THE INVENTION

1. Field of the Invention

This invention is in the field of fasteners for securing webs and belts.

2. Description of the Prior Art

Recently enacted laws require seats within automobiles for restraining a child or infant. Typically, the seats include a harness which is releasably securable around the child with the harness passing over the shoulders and having a front end releasably locked to a buckle or similar fastening device. Such a seat with harness is shown in U.S. Pat. No. 4,660,889 issued to Indiana Mills & Manufacturing, Inc. The harness passing over the child's shoulders and through the seat has an opposite end frictionally engaged by a web adjuster mounted to the seat. The web adjuster has a pivotally mounted cam member which may be released to facilitate sizing of the harness relative to the child. Such web adjusters are also shown in U.S. Pat. Nos. 296,678 and 303,232 assigned to Indiana Mills & Manufacturing, Inc.

The aforementioned web adjusters include an outwardly extending handle allowing the user to pivot the cam member for releasing the web relative to the adjuster. In U.S. Pat. No. 4,679,852 assigned to Indiana Mills & Manufacturing, Inc. a rotatable rod mounted to the child's seat extends through the web adjuster handle to allow the user to rotate the rod and thereby pivot the web adjuster handle. In the case of an infant seat as compared to the child's seat disclosed in the aforementioned patents, the dimensions of the seat and web are considerably reduced. As a result, the outwardly projecting handle of the web adjuster does not conveniently fit or provide a streamlined infant seat configuration. I have therefore provided a web adjuster having a more compact means for operating the pivotally mounted cam member of the web adjuster. Disclosed herein is such a web adjuster having alternate designs. In one design, the cam member may be pushed for pivoting the cam member whereas in an alternate design, the control means may be pulled for pivoting and thereby releasing the cam member.

SUMMARY OF THE INVENTION

One embodiment of the present invention is a a low Profile web adjuster including a frame with a base wall and a pair of upstanding walls extending therefrom, a mounting device mounted to and extending between the upstanding walls, the mounting device being spaced apart from the base wall, a cam member having a pivot axis and being pivotally mounted by the pin to the upstanding walls on the pivot axis, the cam member including a web engageable friction surface movable toward the base wall to hold a web therebetween, a spring engaged with the cam member normally forcing the friction surface to a web engageable position but yieldable to allow the cam member to pivot moving the friction surface away from the web engageable position to a release position allowing the web to move relative to the frame and the cam member, and, a control slidably mounted to the frame and engaged with the cam member operable to move the friction surface from the web engageable position to the release position, the friction surface when in the web engageable position allowing the web to move in a tightening direction but limiting movement of the web in a release direction which is in a direction opposite of the tightening direction, the control being movable in the direction of the tightening direction to move the cam member to the release position and allow the web to be moved in the release direction.

Another embodiment of the present invention is a a a low profile web adjuster including a frame with a base wall and a pair of upstanding walls extending therefrom, a mounting device mounted to and extending between the upstanding walls, the mounting device being spaced apart from the base wall, a cam member having a pivot axis and being pivotally mounted by the pin to the upstanding walls on the pivot axis, the cam member including a web engageable friction surface movable toward the base wall to hold a web therebetween, a spring engaged with the cam member normally forcing the friction surface to a web engageable position but yieldable to allow the cam member to pivot moving the friction surface away from the web engageable position to a release position allowing the web to move relative to the frame and the cam member, and, a control slidably mounted to the frame and engaged with the cam member operable to move the friction surface from the web engageable position to the release position, the friction surface when in the web engageable position allowing the web to move in a tightening direction but limiting movement of the web in a release direction which is in a direction opposite of the tightening direction, the control being movable in the direction of the release direction to move the cam member to the release position and allow the web to be moved in the release direction.

It is an object of the present invention to provide a new and improved web adjuster.

A further object of the present invention is to provide a web adjuster having a low profile.

Yet another object of the present invention is to provide a low profile web adjuster useable with an infant seat.

Related objects and advantages of the present invention will be apparent from the following description.

DESCRIPTION OF THE PREFERRED EMBODIMENTS

Figure 1:
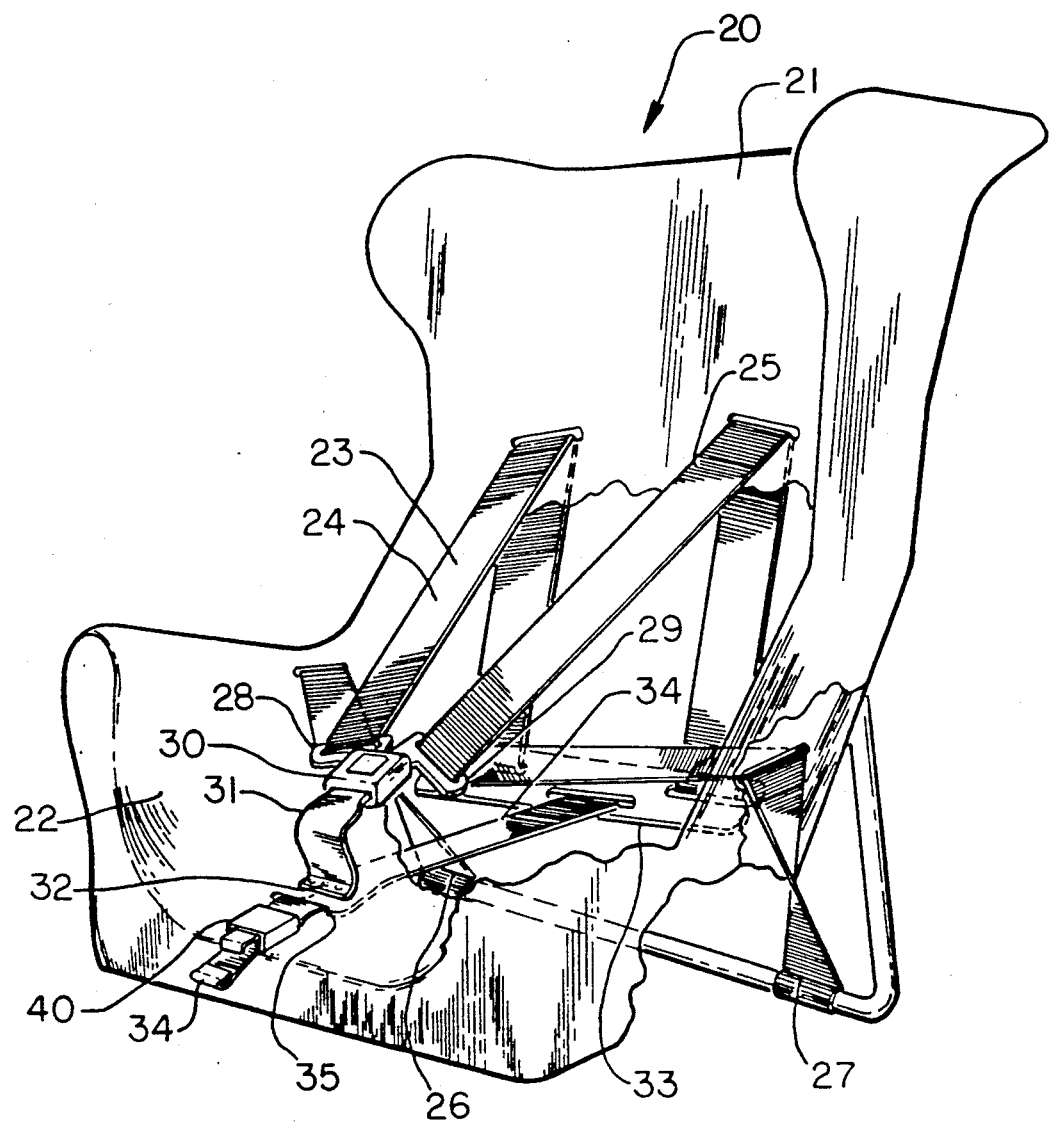
FIG. 1 is a perspective fragmentary view of a seat having the adjuster incorporating the present invention.
Figure 2:
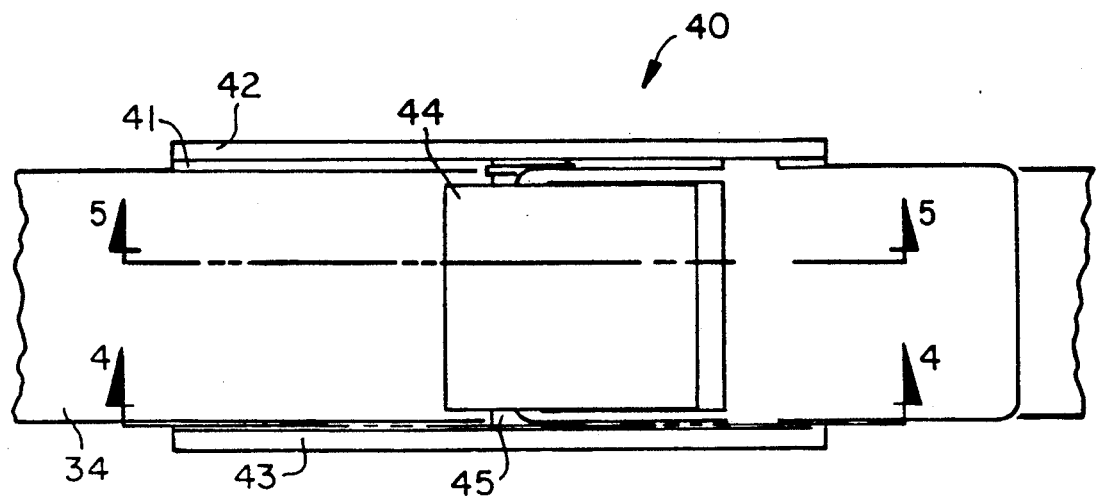
FIG. 2 is an enlarged top view of the preferred embodiment of the web adjuster mounted to the seat of FIG. 1 with the outer housing removed.
Figure 3:
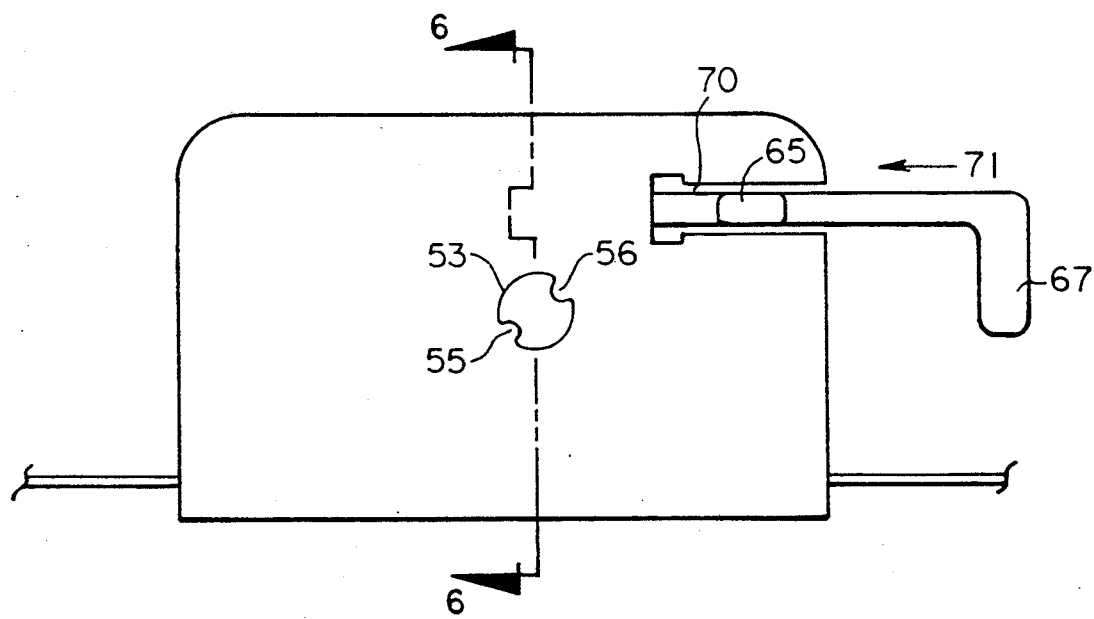
FIG. 3 is a side view of the adjuster of FIG. 2.
Figure 4:
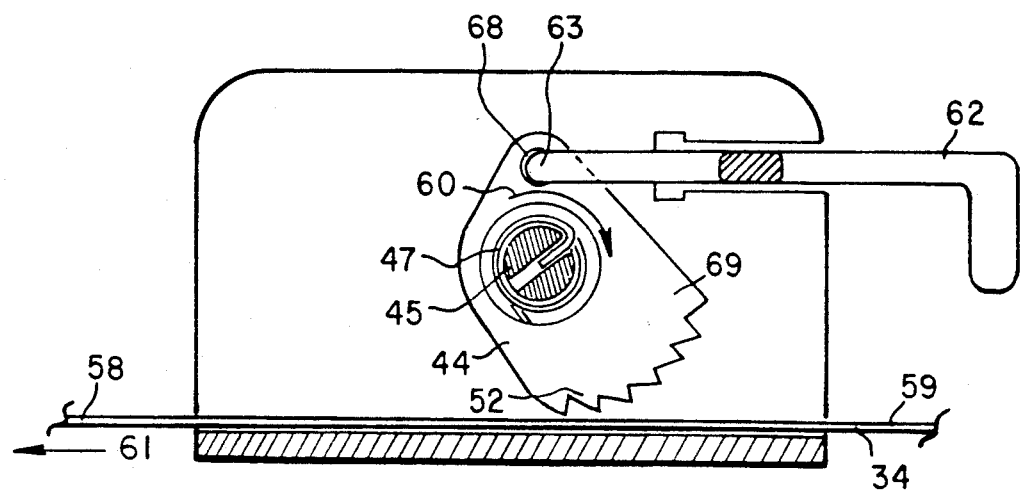
FIG. 4 is a cross-sectional view taken along the line 4—4 of FIG. 2 and viewed in the direction of the arrows.
Figure 5:
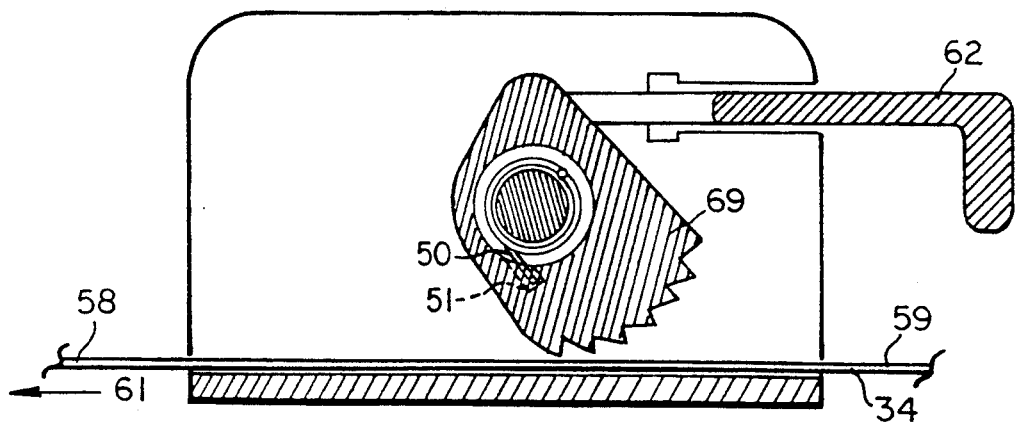
FIG. 5 is a cross-sectional view taken along the line 5—5 of FIG. 2 and viewed in the direction of the arrows.
Figure 6:
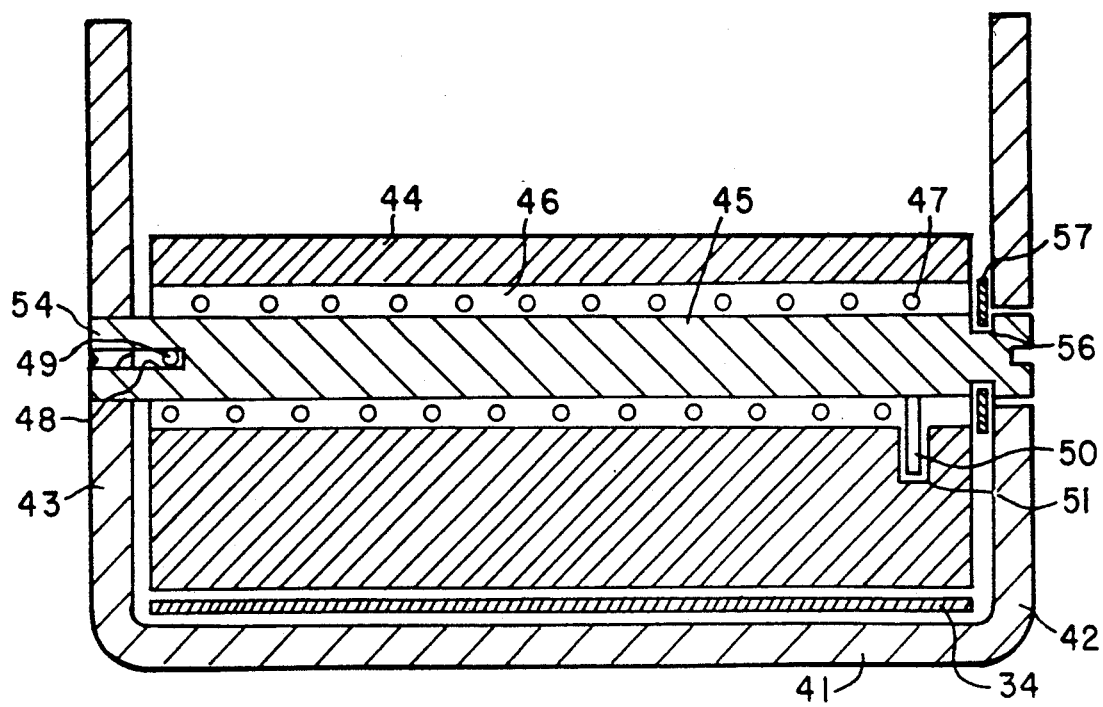
FIG. 6 is an enlarged cross-sectional view taken along the line 6—6 of FIG. 3 and viewed in the direction of the arrows.
Figure 7:
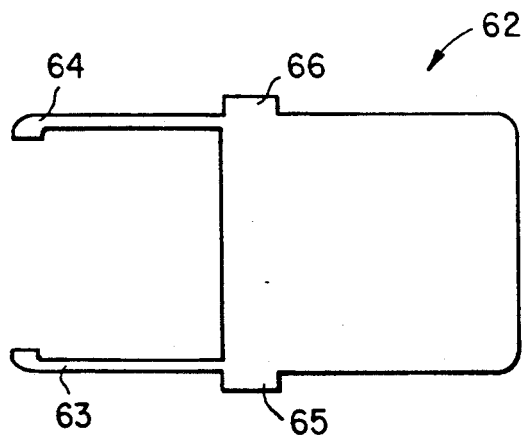
FIG. 7 is a plan view of the push button of the web adjuster.
Figure 8:
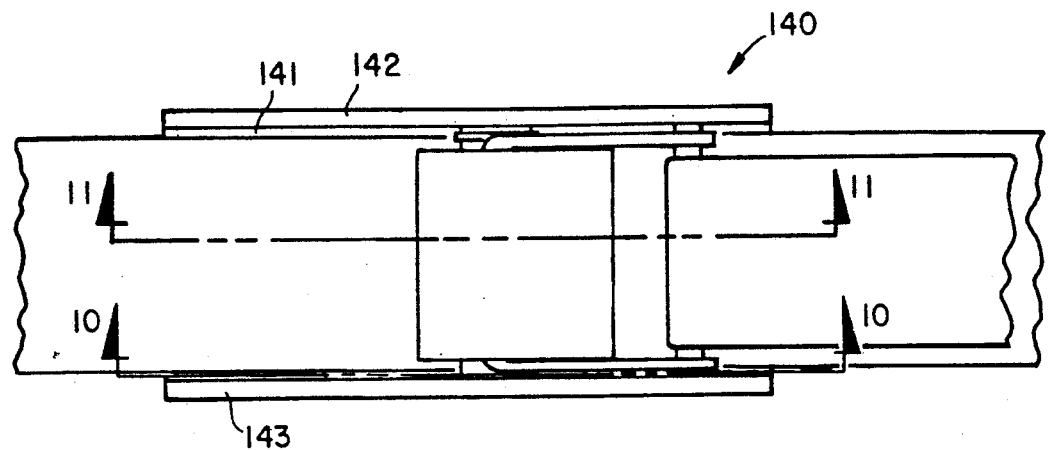
FIG. 8 is the same view as FIG. 2 only showing an alternate embodiment.
Figure 9:
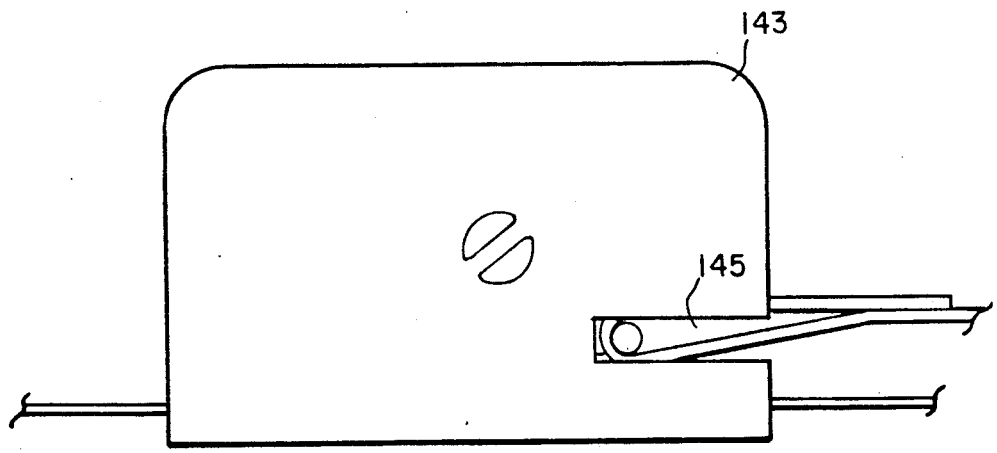
FIG. 9 is a side view of the web adjuster of FIG. 8.
Figure 10:
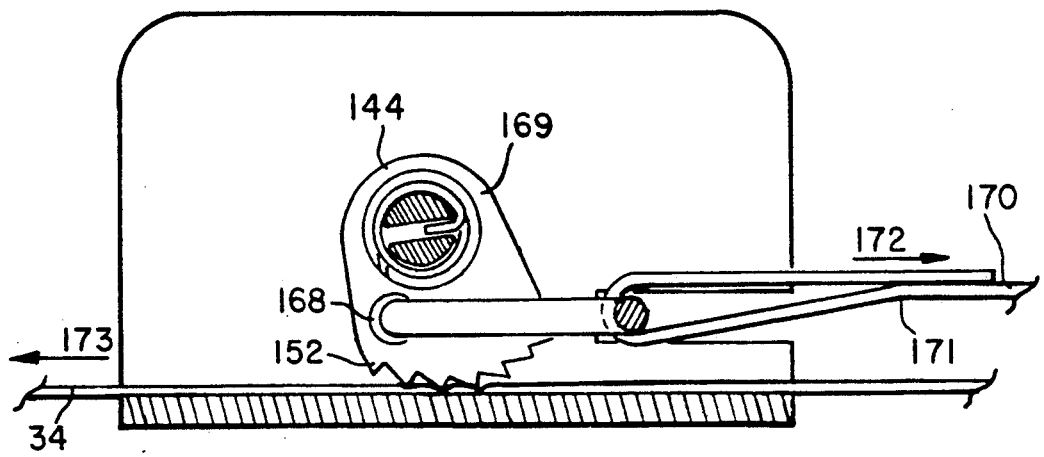
FIG. 10 is a cross-sectional view taken along the line 10—10 of FIG. 8 and viewed in the direction of the arrows.
Figure 11:
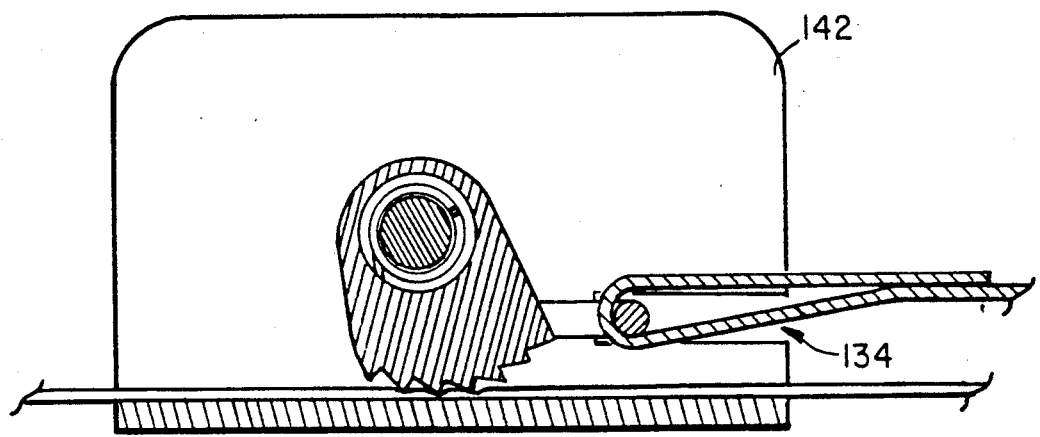
FIG. 11 is a cross-sectional view taken along the line 11—11 of FIG. 8 and viewed in the direction of the arrows.
Figure 12:
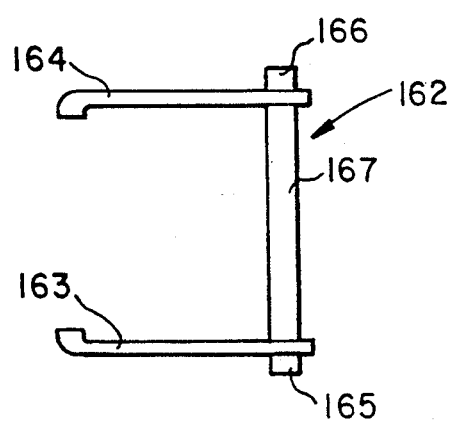
FIG. 12 is a plan view of the pull control for the web adjuster of FIG. 8

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown an infant seat 20 having a back portion 21 and seat portion 22 integrally connected together. A harness 23 is mounted to the seat and is designed to adjust to the size of the infant placed on the seat. A variety of different types of harnesses may be installed onto the seat. In FIG. 1, a 5 point harness is depicted. As such, harness 23 includes two webs 24 and 25 having respectively first ends 26 and 27 fixedly fastened to the seat with both webs slidably extending respectively through a pair of conventional separate tongues 28 and 29 releasably lockable to a conventional seat belt buckle 30. Buckle 30 is secured to strap 31 having a strap end 32 fixedly secured to the seat. Webs 24 and 25 extend slidably through slots provided in back portion 21 of the seat with the webs then extending rearwardly of the seat being fastened to a bar 33. The bar is also fastened to a third web 34 extending forwardly through a slot 35 formed in seat portion 22. Web 34 then extends releasably through a web adjuster 40 fastened to the seat. Operation of the web adjuster allows web 34 to be loosened or tightened which in turn results in the loosening or tightening of harness 23.

Many variations are contemplated and included in the present invention. For example, the web adjuster is shown in combination with a 5 point harness although the web adjuster will work equally well with other types of harnesses so long as the web adjuster is operable to loosen or tighten the harness.

The preferred embodiment of the web adjuster is shown in FIG. 2 through FIG. 7 with the alternate embodiment of the adjuster being shown in FIG. 8 through FIG. 12. Web adjuster 40 includes an outer housing enclosing a U-shaped metal frame having a base wall 41 integrally joined to a pair of upstanding walls 42 and 43. The web adjuster housing shown in FIG. 1 has been removed from the remaining figures to depict the inner construction. Base wall 41 is fixedly fastened by rivets or other suitable fastening means to the seat portion 22 of the seat so that the base wall extends generally horizontal. Pivotally mounted by pin 45 to and between walls 42 and 43 is a cam member 44. Cam member 44 (FIG. 6) includes a through hole 46 within which is positioned a helical spring 47 and pin 45. The pin extends centrally through the helical spring and has a slot 48 at one end to receive one end 49 of the spring with the opposite end 50 of the spring extending into a hole 51 provided in the cam member. The helical spring is installed with the opposite ends in slot 48 and hole 51 so that the plurality of friction ridges 52 (FIG. 4) provided on the outer surface of the cam member are forced against web 34 trapping the web between the cam member and base wall 41.

Wall 43 includes an aperture 53 (FIG. 3) through which end 54 of the pin extends. Aperture 53 is restricted forming a pair of inwardly projecting teats 55 and 56 which extend into slot 48 preventing rotational movement of the pin. The opposite end of the pin includes a groove 56 (FIG. 6) located immediately inward of wall 42 when the pin is installed to the adjuster. A conventional C-shaped clamp 57 is mounted within the grove preventing the pin from disengaging walls 42 and 43.

End portion 58 (FIG. 4) of web 34 extends through a slot 35 (FIG. 1) formed in seat support 22 and is attached by means of bar 33 to the harness. The free end 59 of the web extends through a hole in the web adjuster housing and lies against the forward portion of the seat. The spring is operable to normally force cam member 44 in the clockwise direction indicated by arrow 60 (FIG.4) thereby causing the friction engaging surface of the cam formed by teeth 52 to engage web 34 preventing movement of the web in the web release direction of arrow 61. At the same time, the web may be grasped by end 59 and pulled in a direction opposite of arrow 61 to tighten the harness. In order to release the harness, a push control 62 is slidably mounted to and between the upstanding walls of the frame and when pushed will rotate cam member 44 in a counter clockwise direction as viewed in FIG. 4 thereby moving teeth 52 apart from web 34 and allowing movement of the web in the direction of arrow 61 thereby loosening the harness.

Push control 62 (FIG. 7) includes a pair of arms 63 and 64 having inwardly turned and opposed distal ends extending into holes provided on the opposite ends of the cam member above the pivot axis. For example, arm 63 extends into hole 68 provided on end 69 of the cam member. A pair of projections 65 and 66 provided on the opposite edges of push control 62 extend slidably respectively into slots provided on upstanding walls 43 and 42. For example, projection 65 is slidably mounted within slot 70 in upstanding wall 43. The push control includes a depending wall 67 allowing the user to push the control in the direction of arrow 71 (FIG. 3) thereby pivoting the cam member in a counter clockwise direction as viewed in FIG. 4 releasing the cam member from the web.

The alternate embodiment of the web adjuster is shown in FIG. 8 through FIG. 12. Web adjuster 140 includes a U-shaped frame having a pair of upstanding walls 142 and 143 integrally joined to a base wall 141 which extends generally horizontal and is affixed to the seat portion of the infant seat. Frame 142 is identical to frame 42 with the exception that the glide slots provided in the upstanding side walls are located beneath the pivot axis of the cam member as compared to the guide slots for web adjuster 40 which are located above the pivot axis of the cam member. Thus, walls 142 and 143 include respectively guide slots 134 and 145 to receive the outwardly extending ears or projections of the pull control. Cam member 144 is identical to cam member 44. Likewise, the helical spring and mounting arrangement of the cam member is identical to the previously described helical spring and mounting arrangement of the cam for web adjuster 40. In lieu of utilizing push control 62, web adjuster 140 has a pull control 162

(FIG. 13). Pull control 162 has a pair of arms 163 and 164 having inwardly turned distal ends projecting into holes provided on the opposite outwardly facing ends of cam 144. For example, arm 163 has an inwardly turned distal end projecting into hole 168 provided on end 169 of the cam element. Ears 165 and 166 project respectively into and slide within slots 145 and 134 provided on upstanding walls 143 and 142. Slots 134 and 145 as well as the slots in walls 42 and 43 for adjuster 40 extend parallel respectively to base walls 141 and 41 to guide the control means 162 and 62 along a straight line while the arms of the control means pivot the cam member. A rod 167 is integrally joined to and between arms 164 and 163 with a fabric tab 170 extending around rod 167. One end 171 of tab 170 is secured by stitching or other suitable means to the main body of the tab with the opposite end of the tab extending freely away from the web adjuster. Thus, tab 170 may be pulled in the direction of arrow 172 (FIG. 10) thereby causing counter clockwise rotation of cam 144 as viewed in FIG. 11 forcing the friction teeth 152 to disengage web 34 allowing the web to be moved in the direction of arrow 173 thereby loosening the harness. Release of tab 170 allows the helical spring to rotate the cam in a clockwise direction as viewed in FIG. 10 thereby engaging web 34 and preventing further loosening of the harness. At the same time, the spring is yieldable to allow the web 34 to be pulled in the direction of arrow 172 to tighten the harness. Notably, fabric strap 170 may be moved in the direction of arrow 172 which is the same direction that web 34 is moved when tightening the harness in order to pivot the cam member thereby releasing web 34 and allowing the harness to be loosened. On the other hand, push control 62 in order to release the cam from the web and loosen the harness must be pushed in the direction of arrow 61 which is the same direction that web 34 is moved when loosening the harness. Push control 62 is moved in a direction different that fabric strap 170 to achieve the same result since the push control is pivotally mounted to the cam at a location above the pivot axis of the cam whereas arms 163 and 164 of the pull control are pivotally mounted to the cam at a location beneath the pivot axis. Push control 62 has arms 63 and 64 pivotally mounted to the cam element on the side of the cam pivot axis opposite of friction teeth 52 whereas the pull control has arms 163 and 164 pivotally mounted to the cam element on the side of the cam pivot axis whereat friction teeth 152 are located.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:
1. A low profile web adjuster comprising:
  a frame including a base wall and a pair of upstanding walls extending therefrom;
  a mounting device mounted to and extending between said upstanding walls, said mounting device being spaced apart from said base wall;
  a cam member having a pivot axis and being pivotally mounted by said mounting device to said upstanding walls on said pivot axis, said cam member including a web engageable friction surface movable toward said base wall to hold a web therebetween;
  spring means engaged with said cam member normally forcing said friction surface to a web engageable position but yieldable to allow said cam member to pivot moving said friction surface away from said web engageable position to a release position allowing said web to move relative to said frame and said cam member;
  control means slidably mounted to said frame and engaged with said cam member operable to move said friction surface from said web engageable position to said release position; and,
  guide means on said upstanding walls slidably receiving said control means being operable to guide said control means between limits of travel of said control means as said control means moves said friction surface from said web engageable position to said release position; and wherein:
  said control means includes a pair of spaced apart arms pivotally engaged with said cam member at a location spaced apart from said pivot axis to pivot said cam member as said control means slides in said guide means;
  said friction surface when in said web engageable position allows said web to move in a tightening direction but limits movement of said web in a release direction which is in a direction opposite to said tightening direction;
  said control means is movable in the direction of said tightening direction to move said cam member to said release position and allow said web to be moved in said release direction;
  said control means includes a main body with said arms thereon, said main body includes a pair of ears slidably mounted to said guide means which includes a pair of slots formed in said upstanding walls receiving said ears, said main body further includes a fabric strap secured thereto allowing said control means to be pulled moving said cam member to said release position with said spring means operable to return said cam member to said web engageble position.

2. The adjuster of claim 1 and further comprising:
  a housing enclosing said cam member and having a hole through which said strap extends, and wherein:
  said slots extend parallel to said base wall guiding said control means along a straight line while said arms pivot said cam member.

3. A low profile web adjuster comprising:
  a frame including a base wall and a pair of upstanding walls extending therefrom;
  a mounting device mounted to and extending between said upstanding walls, said mounting device being spaced apart from said base wall;
  a cam member having a pivot axis and being pivotally mounted by said mounting device to said upstanding walls on said pivot axis, said cam member including a web engageable friction surface movable toward said base wall to hold a web therebetween;
  spring means engaged with said cam member normally forcing said friction surface to a web engageable position but yieldable to allow said cam member to pivot moving said friction surface away from said web engageable position to a release position allowing said web to move relative to said frame and said cam member;

control means slidably mounted to said frame and engaged with said cam member operable to move said friction surface from said web engageable position to said release position; and, guide means on said upstanding walls slidably receiving said control means being operable to gudie said control means between limits of travel of said control means as said control means moves said friction surface from said web engageable position to said release position; and wherein:

said control means includes a pair of spaced apart arms pivotally engaged with said cam member at a location spaced apart from said pivot axis to pivot said cam member as said control means slides in said guide means;

said friction surface when in said web engageable position allows said web to move in a tightening direciton but limits movement of said web in a release direction which is in a direction opposite of said tightening direction;

said control means is movable in the direction of said release direction to move said cam member to said release position and allow said web to be moved in said release direction;

said control means includes a main body with said arms thereon, said main body includes a pair of ears slidably mounted to said guide means which includes a pair of slots formed in said upstanding walls receiving said ears, said main body further includes a push surface formed thereon allowing said control means to be pushed moving said cam member to said release position with said spring means operable to return said cam member to said web engageable position.

4. A low profile web adjuster comprising:

a frame including a base wall and a pair of upstanding walls extending therefrom;

a mounting device mounted to and extending between said upstanding walls, said mounting device being spaced apart from said base wall;

a cam member having a pivot axis and being pivotally mounted by said mounting device to said upstanding walls on said pivot axis, said cam member including a web engageable friction surface movable toward said base wall to hold a web therebetween;

spring means engaged with said cam member normally forcing said friction surface to a web engageable position but yieldable to allow said cam member to pivot moving said friction surface away from said web engageable position to a release position allowing said web to move relative to said frame and said cam member;

control means engaged with said cam member operable to move said friction surface from said web engageable position to said release position; and, guide means on said frame receiving said control means being operable to guide said control means between limits of travel of said control means as said control means moves said friction surface from said web engageable position to said release position; and wherein:

said control means includes a main body pivotally engaged with said cam member at a location spaced apart from said pivot axis to pivot said cam member as said control means is guided by said guide means;

said friction surface when in said web engageable position allows said web to move in a tightening direction but limits movement of said web in a release direction which is in a direction opposite of said tightening direction;

said main body includes a cooperating guide movably mounted to said guide means which together include an interacting slot and projection with said slot extending in the direction of said web allowing said control means to move said cam member to said release position with said spring mean operable to return said cam member to said web engageable position.

* * * * *